United States Patent [19]
Driver et al.

[11] 4,362,014
[45] Dec. 7, 1982

[54] ROTARY MACHINES AND POWER SYSTEMS USING SAID MACHINES

[76] Inventors: Ronald W. Driver, 9 Rydal Pl., Clitheroe, Lancashire; Edwin J. Hardaker, 36 Devonshire St., Skipton, North Yorkshire, both of England

[21] Appl. No.: 107,341

[22] Filed: Dec. 26, 1979

[30] Foreign Application Priority Data

Jan. 2, 1979 [GB] United Kingdom ............... 7900040
Jan. 2, 1979 [GB] United Kingdom ............... 7900076

[51] Int. Cl.³ ............................................. F02C 3/04
[52] U.S. Cl. .................................... 60/39.43; 60/39.25
[58] Field of Search ............ 60/39.25, 39.43, 39.51 R, 60/39.28 R

[56] References Cited
U.S. PATENT DOCUMENTS

| 2,219,994 | 10/1940 | Jung | 60/39.28 R |
| 2,755,621 | 7/1956 | Terrell | 60/39.25 X |
| 3,057,157 | 10/1962 | Close | 60/39.43 |
| 3,508,395 | 4/1970 | Sebestyen | 60/39.25 |
| 3,585,795 | 6/1971 | Grieb | 60/39.25 X |
| 3,774,395 | 11/1973 | Greune et al. | 60/39.25 X |
| 3,782,110 | 1/1974 | Kobayashi | 60/39.43 |

Primary Examiner—Allen M. Ostrager
Assistant Examiner—Stephen F. Husar
Attorney, Agent, or Firm—William R. Hinds

[57] ABSTRACT

A rotary machine, having a casing and a rotor rotatable eccentrically in the casing to define an eccentric annulus divided into compartments by vanes, to function either as a compressor or an expansion engine has the vanes pivoted at the rim of the rotor and driven by a mechanical coupling to their operative positions. The vanes are driven by cranks lying in planes outside but parallel to the planes in which the vanes operate. The vanes operate with a minimal clearance between vane tip and casing in order, ideally, to provide zero friction at the vane tip.

A power system is disclosed in which air is compressed, heated in a flame tube, expanded under volume confined conditions in a rotary machine as described to an intermediate pressure, and expanded to ambient under volume confined conditions in another rotary machine as described. The machine may drive auxiliaries in a vehicle.

4 Claims, 13 Drawing Figures

ROTARY MACHINES AND POWER SYSTEMS USING SAID MACHINES

BACKGROUND OF THE INVENTION

This invention relates to rotary machines of the kind comprising:
(a) a casing;
(b) a rotor rotatable eccentrically in, or with one part of, the casing and having means to define with, or with another part of, the casing, peripheral compartments which are separate from each other;
(c) an inlet for the inflow of a medium to the compartments sequentially as the rotor rotates;
(d) an outlet, displaced in the direction of rotation of the rotor from the inlet, for the outflow of said medium, and
(e) a shaft whereby power can be supplied to or taken from said rotor.

Such machines can be adapted to perform either an engine function by allowing a hot inlet gas to expand in the compartments as the compartments increase in volume or a compressor function by supplying an inlet gas to be compressed in the compartments as the compartments decrease in volume.

Examples of such machines are shown in British Pat. Nos. 355,042; 438,730; 448,903; 453,908; 624,990; 706,292 and 1,540,057. In most of these, the compartments are defined by vanes coupled to the rotor and defining the compartments with the casing, the vanes being in contact with the casing which can give rise to excessive frictional losses. In No. 448,903 the vanes carry a drum in the casing, the drum being driven by the vanes, leading to considerable power requirements.

Further, certain crank-driven vane arrangements require to operate in a casing which is not truly circular and this introduces manufacturing and wear problems.

It is one object of the present invention to provide a crank driven vane arrangement which can operate in a truly circular casing.

SUMMARY OF THE INVENTION

The invention provides a rotary machine comprising:
(a) a casing;
(b) a rotor rotatable eccentrically in the casing to define an eccentric annulus and having vanes pivotably secured to the periphery of the rotor to define with the casing compartments in the eccentric annulus which are separate from each other;
(c) an inlet opening for the inflow of a medium to the compartments sequentially as the rotor rotates;
(d) an outlet, displaced in the direction of rotation of the rotor from the inlet, for the outflow of said medium;
(e) a coupling whereby power can be supplied to or taken from said rotor;
(f) crank arms movable in planes parallel to but displaced from the planes occupied by the vanes and oscillating arms rotatably oscillatable about a pillar which is fixed in relation to the casing, the oscillating arms being secured to the crank arms to mechanically pivot the crank arms and hence the vanes to their operative positions.

The invention also relates to fuel burning power systems. Fuel burning power systems such as a reciprocating petrol, diesel or gas engine or a turbine engine, has a peak efficiency at one point in its power output range. Where such an engine operates over a wide load range, such as in a motor car, it is generally operating at other than its peak efficiency and this represents significant energy waste and needless pollution. Usually, the added complexity of variable speed gear boxes and clutches in the output drive are also required.

It is one object of the present invention to provide a power system which is directed to overcoming the disadvantages referred to above.

The power system according to the present invention is arranged, as distinct from a turbine compressor, to compress air under volume confined conditions, then heat the compressed air in a gas turbine type of fuel combustion device, such as a flame tube, and then expand the hot gas again under volume confined conditions, power variation being achieved mainly by varying mass flow through the system.

A system according to the invention can be operated without throttling of the air intake and without altering the air/fuel ratio or otherwise departing, for the majority of the load range, from high efficiency operating conditions.

The operation of engines according to the present invention depends on the use of rotary machines for the compression and expansion of a larger volume of gas than is normally used in piston engines for a given power without excessive leakage or friction. The chosen rotary machines are of the kind stated to comprise the invention above.

A typical power system according to the present invention comprises at least two such rotary machines, one of which (conveniently called a "gas generator") accepts compressed ambient cold air and compresses it further over a part of its eccentric annulus and then, after adding heat, by means described below, it is allowed to expand partially and to perform work in a further part of the eccentric annulus. The partially expanded gas is taken from the gas generator and fed to the other of the rotary machines (conveniently called the "drive engine") where it is expanded further and thereby a power output is derived which could typically be used to drive a motor vehicle.

The gas generator can be in the form in which said further compressed air is caused to be heated by having added to it a hot gas without leaving the generator or it may be of a form where the further compressed gas is exhausted from the generator and is caused to be heated, such as by a flame tube, and is then reintroduced into the generator for partial expansion.

The drive engine preferably includes a valve mechanism which can regulate the "cut-off" position of gas fed to the engine so that high starting torques can be generated.

Ambient cold air can be compressed by a device of similar form to that used as the gas generator or the drive engine but operating as a compressor.

The gas generator can drive an output shaft for accessories such as oil and fuel pumps and the ambient air compressor. The further compressed air is exhausted from the gas generator to a heat source via a heat exchanger to preheat that air before it enters the heat source, the heat being derived from the expanded gas exhausted from the gas generator.

Overall control of the system can be effected by a power lever which, via an appropriate servo-control, regulates the cut-off position of gas fed to the drive engine.

BRIEF DESCRIPTION OF THE DRAWINGS

The invention may be performed in various ways and a preferred embodiment will now be described with reference to the accompanying drawings in which.

DESCRIPTION OF THE PREFERRED EMBODIMENTS

Figure 1:
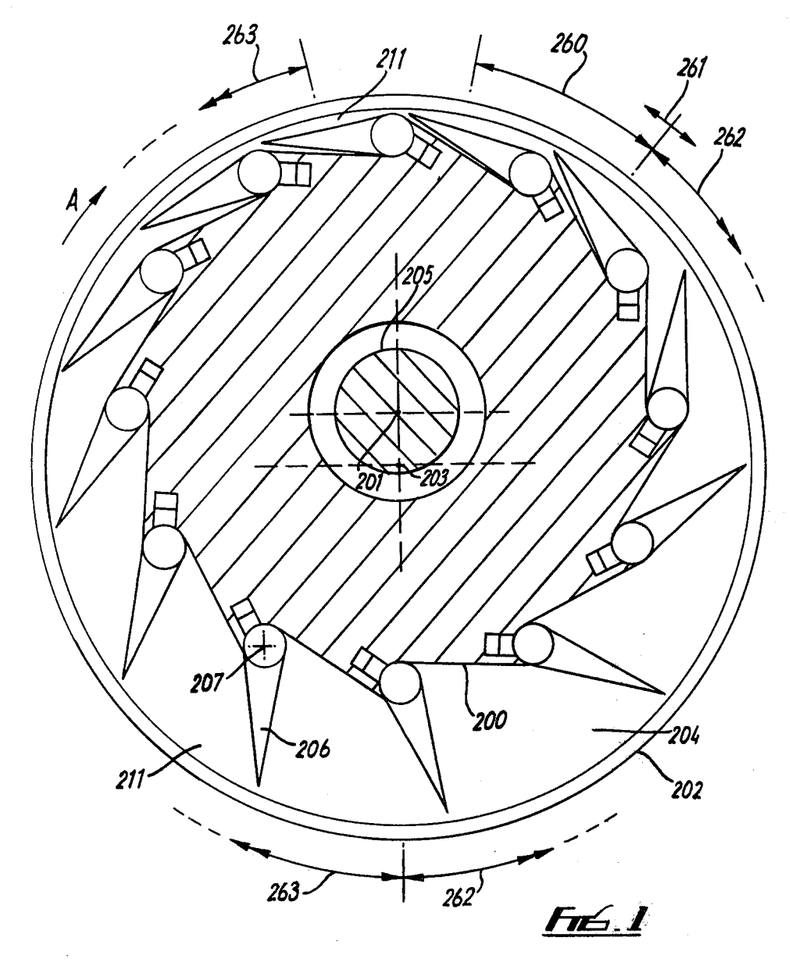
FIG. 1 is a diagrammatic representation of a rotor of a rotary machine embodying the invention.

In FIG. 1 there is shown a rotary engine having an engine rotor 200 with an axis 201 and a fixed truly cylindrical casing 202 with axis 203. The rotor 200 is seen to be eccentric in the casing 202 and defines with the casing an eccentric annulus 204. The rotor is rotatable on a static axle 205 and is equipped with twelve angularly spaced vanes 206 carried on pivots, indicated by axes 207, and running in the casing with a very small clearance between their tips and the casing. The vanes 206 are each respectively mechanically coupled to cranks 208 (now see FIG. 2) and the cranks are oscillated by respective connecting arms 209 mounted on a casing pillar 210, that is, about axis 203. The vanes define peripheral compartments 211 in the eccentric annulus which cyclically change in volume as the rotor rotates. The rotor is arranged for rotation in the direction of arrow A. The outer surface of the vanes 206 could be curved so that when the compartments have smallest volume this surface substantially conforms to the inner surface of the casing and has a running clearance therewith.

Figure 3:
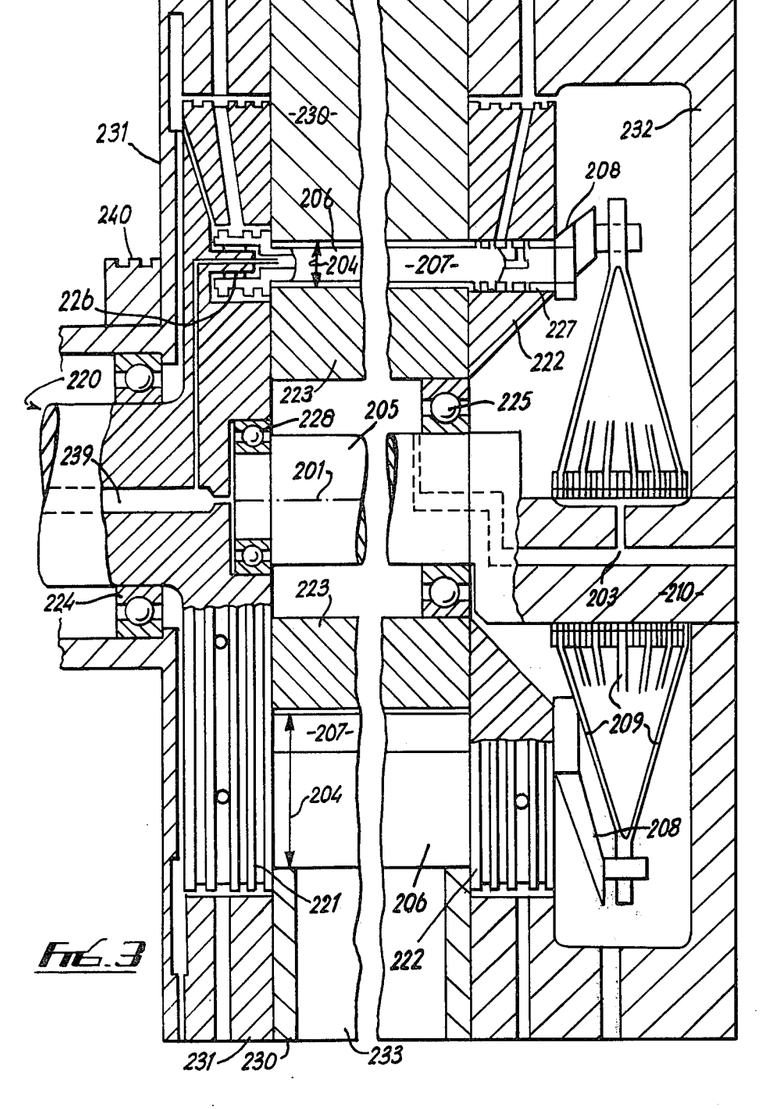
FIG. 3 is a sectional side elevation of an engine using the rotor of FIG. 1 and vane coupling arrangement of FIG. 2.

Components 200 to 210 are also indicated in FIG. 3 which will now be described.

The main static parts of the engine comprise the casing 202; casing pillar 210 with axis 203; and static axle 205 with axis 201.

The main rotating parts of the engine comprise the rotor 200 which has a saw-tooth periphery and is rotatable about axis 201 of axle 205; vanes 206, rotatable about axes 207 at the roots of the saw teeth; cranks 208; and connecting arms 209. As shown in FIG. 3 the vanes 206 substantially fully axially occupy the eccentric annulus 204 (indicated by "dimension" lines 204).

Other parts of the rotor are: an input or output shaft 220 integral with a sealing, bearing and lubricating front plate 221 and rear end plate 222. Between the plates 221, 222 there is the main body 223 of the rotor. The rotor is carried on bearings 224, 225, 228 and the vanes 206 are supported on bearings 226, 227, in the plates 221, 222.

Other parts of the casing are: the main block 230, the front cover plate 231 and rear cover plate 232. The block 230 defines a radial exhaust port 233. The form and location of inlet ports will be determined by the function the machine has to perform. There is shown in FIG. 3 a feature 240 (which is a part of the cover plate 231) to co-operate with an adjustable inlet valve 250 (described in more detail with reference to FIG. 4) for use when the machine is performing the function of an expander to drive shaft 220. Oil passageways 239 are indicated.

Figure 4:
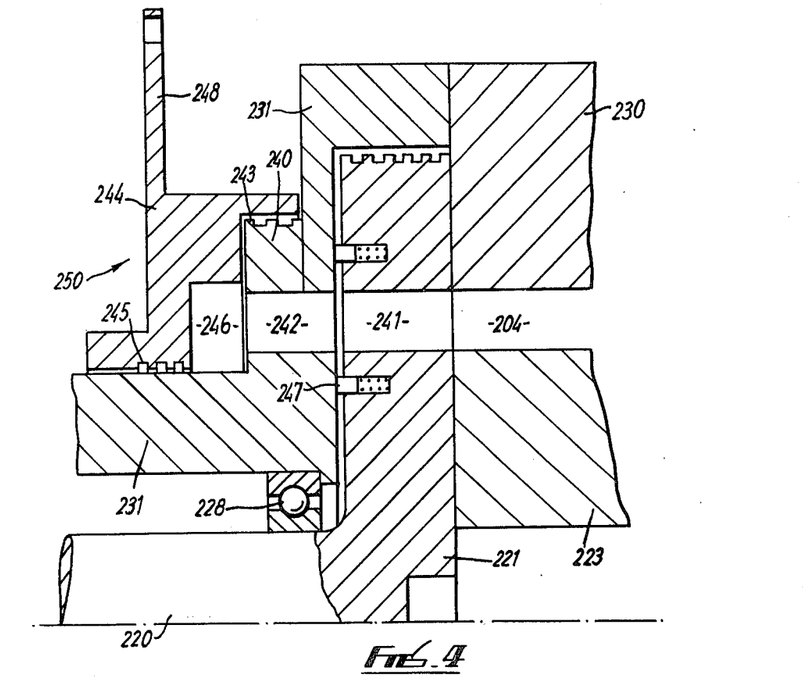
FIG. 4 is a diagrammatic representation of an inlet valve suitable for use with the engine of FIG. 3.

FIG. 4, which is taken on a displaced section plane to that of FIG. 3, shows a fragment of the static parts 231 and 230. It also shows a fragment of the rotary parts 223 and 221, the bearing 228, and the eccentric annulus 204 at a part not occupied by a vane 206.

Figure 6:
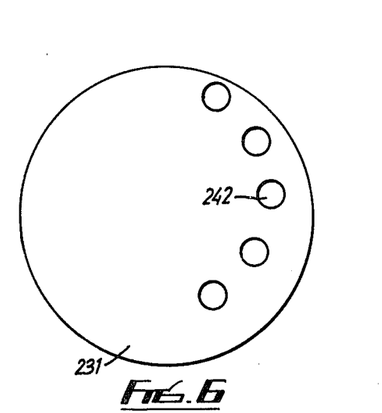
FIG. 6 shows a fixed part of the valve of FIG. 4.

There is additionally shown one of a series of holes 241 through the rotor plate 221. These are located between holes which accommodate the bearings 226 for the vanes 206. The casing has a series of angularly spaced holes 242 in the feature 240 (see also FIG. 6), the feature 240 also having labyrinth sealing grooves 243.

Figure 5:
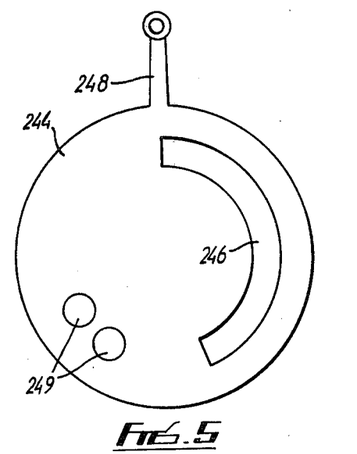
FIG. 5 shows a movable part of the valve of FIG. 4.

A rotary vane 244 (see also FIG. 5) is mounted on the casing 202 and has a labyrinth seal region 245 with the casing 202 (231). The vane 244 defines a manifold 246 which acts as a supply chamber so that an inlet supply can be made to the engine via angularly spaced holes 242 in the casing and angularly spaced holes 241 in the rotor to reach the eccentric annulus 204 in which the vanes 206 move and define compartments. Each hole 241 is sealed by a face seal 247. The vane 244 has an operating lever 248 and as the vane 244 is rotated by the lever 248 so more or less holes 242 are exposed to the manifold 246.

The vane 244 also has anti-suction non-return valves 249 (FIG. 5) to give ambient conditions access to the annulus 204 in the event that there is starving of inlet supply which, in the absence of valves 249, would cause a braking torque to be applied to the rotor 200.

In use of the machine above described with reference to FIGS. 1 to 6, a hot pressurised gas or air is supplied to the valve 250 to enter the manifold 246 and thereby gain entry to the vane annulus 204 via holes 242, 241. The number of holes exposed to the manifold will depend on the rotary position of the vane 244 which can move between a position in which no holes are exposed and a position in which all holes are exposed. For start-up of the machine (i.e. for maximum torque) the latter will apply. For running of the machine a lesser number of holes will be exposed.

The expansion of the supplied gas typically takes place in the peripheral compartments 211 as they increase in volume and once they are beyond the supply cut-off point determined by the position of vane 244. This expansion applies a driving torque to the shaft 220. As the compartments 211 decrease in volume, the expanded gas is exposed to an exhaust port 233 which may typically angularly extend over about five compartments.

Typical porting is indicated diagrammatically in FIG. 1 in which: line 260 indicates the extent of the inlet port, which is adjustable as indicated by line 261; line 262 indicates the region of expansion; and line 263 indicates the angular extent of the exhaust port.

The machine above described with reference to FIGS. 1 to 3 could be used as a compressor, in which event shaft 221 would become an inlet shaft and porting would be like that shown in FIG. 8. Items shown in FIGS. 5 and 6 would not be required.

Figures 8, 9:
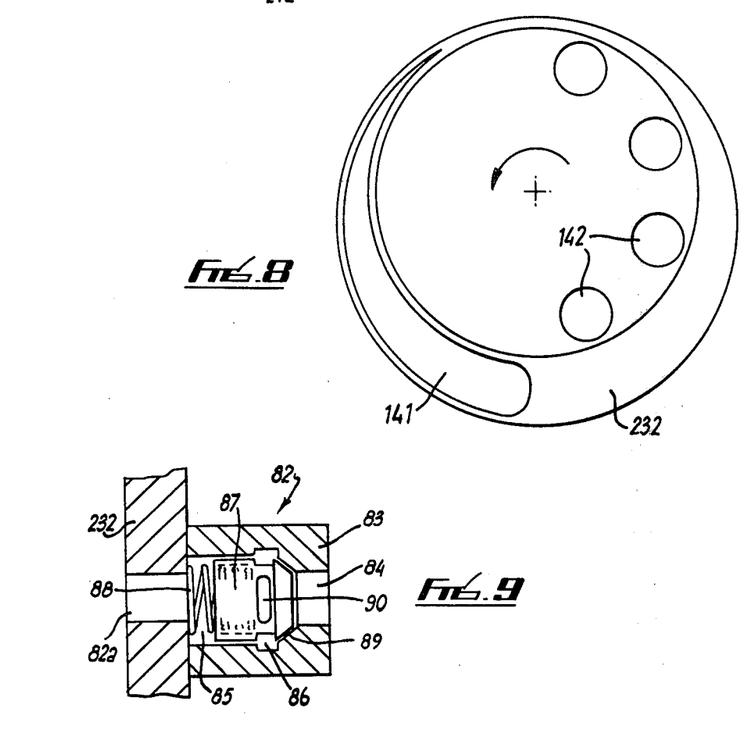
FIG. 8 is a porting diagram for a machine according to the invention acting as a compressor.
FIG. 9 is a section of a non-return valve.

FIG. 8 shows a side plate 131a (which replaces plate 232) and the plate defines an inlet port 141 and fan outlet ports 142. Each port 142 has a non-return valve as shown in FIG. 9 but operating in the "reverse" direction. The rotor has ports which allow compartments 211 to communicate with ports 142 in turn.

Each valve 82 (FIG. 9) comprises a cylinder 83 having open ends 84, 85. The cylinder has an annular groove 86 and a hollow piston 87 moves in the cylinder under the influence of a spring 88. The piston has a chamfered head 89 and ports 90 through the wall of the piston. The head 89 forms a valve closure surface with a correspondingly chamfered surface on the cylinder 83. When pressure to the inside of plate 131a falls below ambient the piston 87 is moved to the left and air enters open end 84, enters groove 86, passes through ports 90 to the inside of the piston and then through open end 85 to increase pressure on the inside of plate 131a.

The machine could also be used as a "mixed compressor" engine. This is illustrated with reference to FIG. 7.

Figure 7:
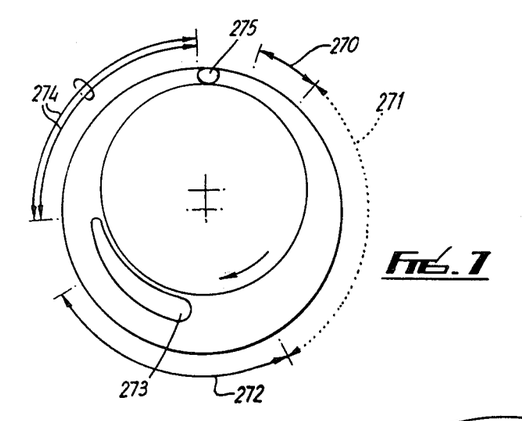
FIG. 7 is a porting diagram for the engine of FIG. 3 when used as a "mixed" compressor/engine.

In this Figure the arrow 270 represents a fixed radial inlet port for a hot gas to be expanded, dotted arrow-headed line 271 represents an expansion region and arrowheaded line 272 represents a radial outlet port for the expanded gas. A side inlet port 273 is shown for entry of air to be compressed and the double arrow-headed line 274 represents a compression region. The compressed air could remain in the machine at the end of line 274 or it could be taken through an outlet port 275, heated and re-introduced at the inlet port represented by arrow 270.

In the machine above described with reference to FIGS. 1 to 3 when used as an engine, the tips of the vanes of the rotor run in close proximity to the machine casing so that heavily loaded sliding contact is avoided. A light spring-loaded tip to the vanes could be provided. The machines could operate at 1100° K. and with a pressure of 5 bars. This is a relatively low pressure for engine operation but it ensures that a pressure of less then ½ bar need exist across each vane of the rotor. If, in operation, this temperature and pressure are kept sensibly constant then the clearance of vane and the casing can be minimal without rubbing, for example 0.02 to 0.04 mm.

Figure 2:
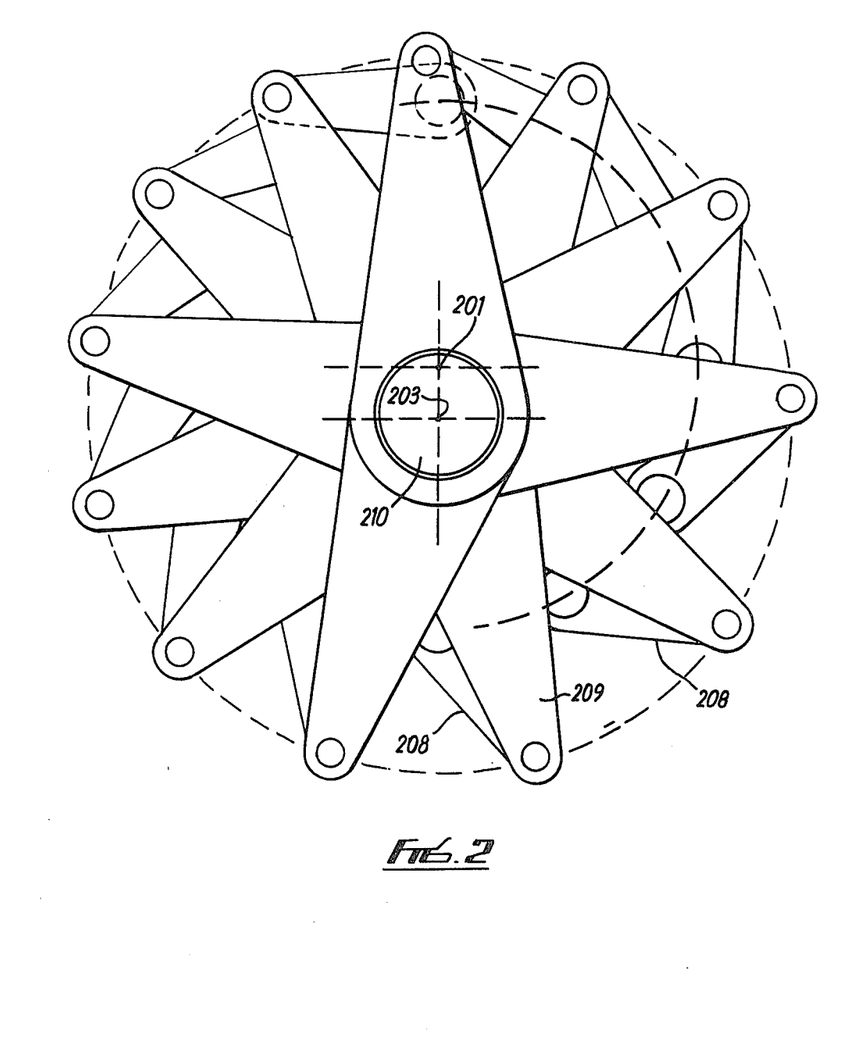
FIG. 2 is a diagrammatic representation of a mechanical coupling for driving the vanes shown in FIG. 1.

Referring now to FIGS. 10 to 13, the power system has two rotary expander engines 10, 11 (engine 10 also compressing) of the kind having a rotor eccentrically mounted in a casing to establish an eccentric annulus divided into separate compartments into which a hot gas can be supplied successively, for example as described in relation to FIGS. 1 to 3. An "engine" of a similar kind is operated "in reverse" as a low pressure compressor 12 which accepts ambient cold air (indicated by arrow 13). The engine 10 is the gas generator of the system and the engine 11 is the drive engine. The compressor 12 feeds ambient compressed air along a duct 14 to one inlet 15 of the gas generator 10 where it receives further compression in certain compartments of the eccentric annulus thereof. The further compressed air then leaves the gas generator 10 at outlet 16 and passes along a duct 17 to one flow path 18 through a heat exchanger 19 where it takes up heat prior to entering a flame tube 20 having a fuel inlet pipe 21 (see also FIG. 12) and hot gas outlet 22. The outlet 22 connects to a second inlet 23 of the gas generator 10 so the hot high pressure gas can expand and do work to drive an ancilliaries shaft 24 and the compressor 12. The ancilliaries include such things as oil and fuel pumps. The expanded hot high pressure gas (now at an intermediate pressure) leaves the gas generator 10 to flow along a duct 25 and enters the other flow path 26 of the heat exchanger 19 to discharge along a duct 27 to the inlet 28 of engine 11. The inlet 28 includes a rotary valve 29 to regulate the cut-off of gas to engine 11. Power from the engine 11 is taken to a drive shaft 30 and the engine exhausts via a pipe 39. An adjustable gas generator delivery vent valve 32 is provided in the duct 27.

Figure 11:
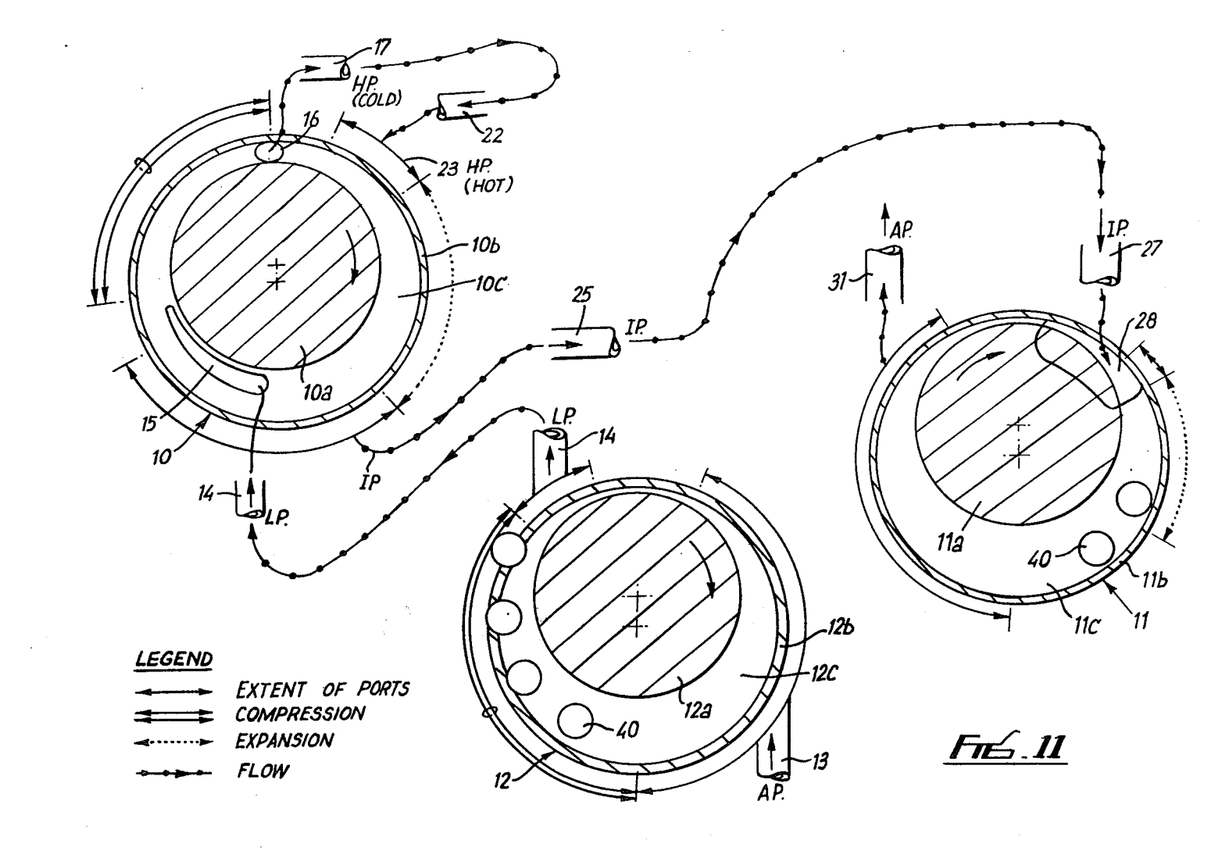
FIG. 11 is a diagrammatic sketch showing porting.

In FIG. 11 the engines 10 and 11 are shown diagrammatically with respective rotors 10a, 11a and respective casings 10b and 11b. The compressor 12 is similarly shown with rotor 12a and casing 12b. Respective eccentric annuli 10c, 11c, 12c are shown but not the compartmentalisation of these annuli.

Figure 10:
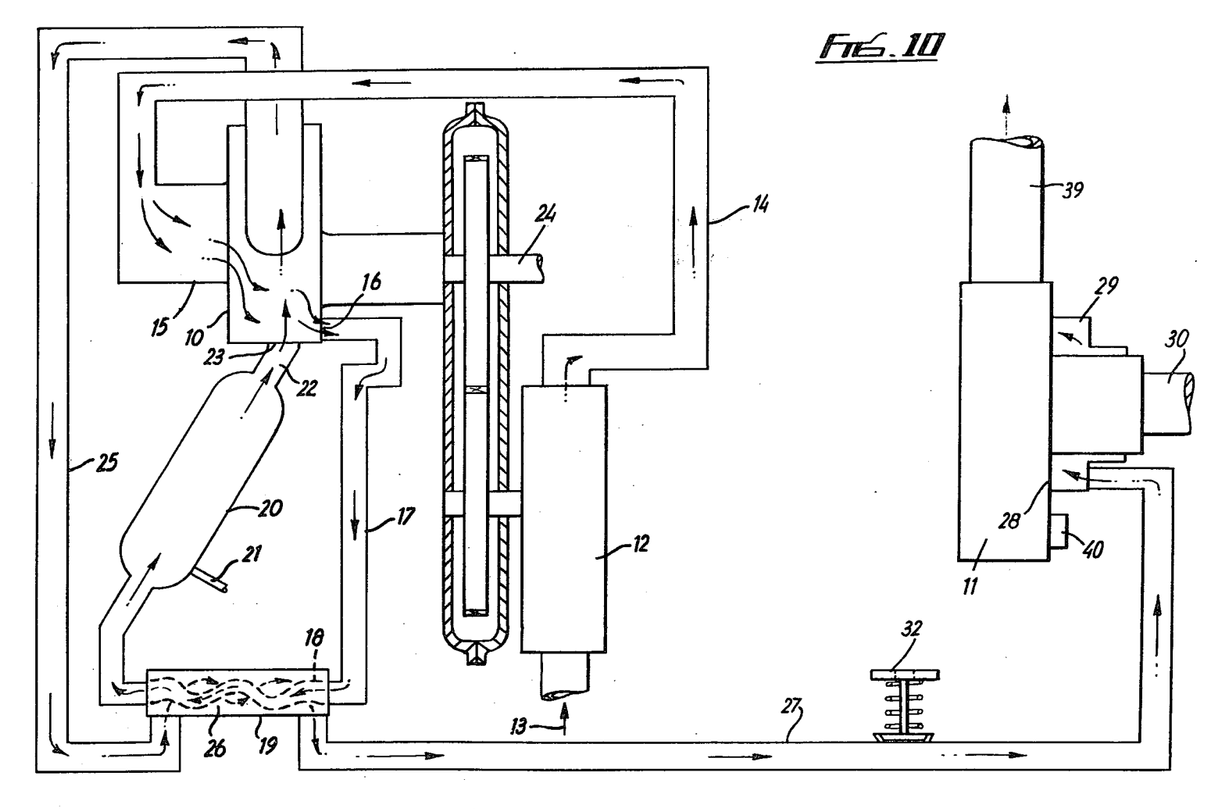
FIG. 10 shows a flow diagram of a power system.

The porting in FIG. 11 carries the same reference numerals as used in FIG. 10 and the extent of the ports is indicated by arcuate arrow-headed lines (see "Legend"). The arcuate extent of compression and expansion in each unit 10, 11, 12 are shown and the overall flow is shown. The markings AP; LP; IP; and HP are used to indicate conveniently pressures at various parts of the system, these pressures being respectively: atmospheric pressure, low pressure; intermediate pressure; and high pressure.

It should be noted that the inlet port 15 to the gas generator 10 is at the side of the casing 10b and that non-return valves 40 in devices 10 and 12 and engine 11 are provided as required to prevent over pressurisation in devices 10 and 12 and as antisuction devices in engine 11.

The units 10, 11 and 12 are preferably constructed in the manner of FIGS. 1 to 3.

Figures 12, 13:
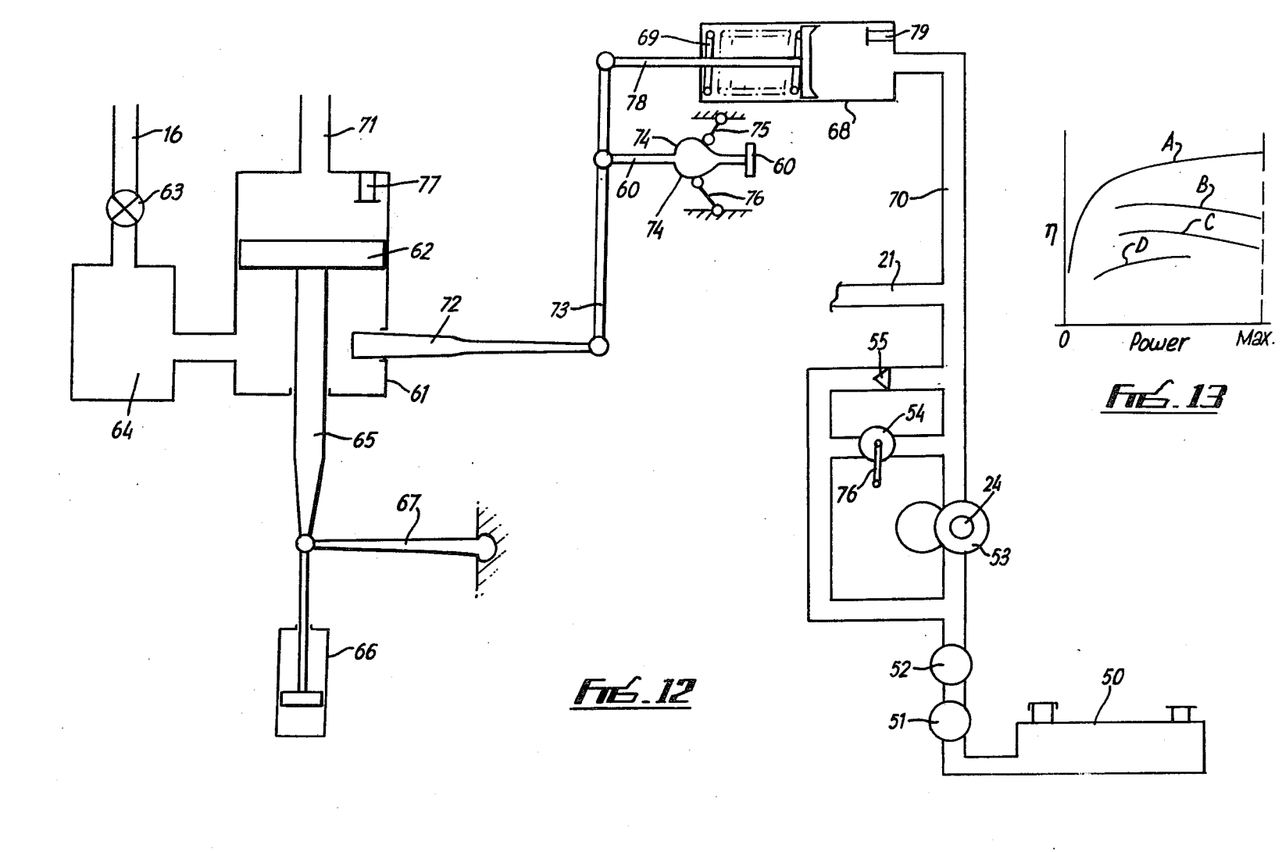
FIG. 12 is a control diagram.
FIG. 13 shows projected performance curves.

FIG. 12 shows the control system for the system disclosed with reference to FIGS. 10 and 11.

System control is exercised by the rotary valve 29 on the drive engine 11 which modifies the cut-off (opening angle) of that engine to increase power. The gas generator 10, apart from during the idling condition and very low power condition, always runs at design conditions of temperature and pressure; power variation being achieved with changes in gas generator speed.

The control system takes fuel from a fuel tank 50 and passes it via a pump 51 and cock 52 to a metering gear pump 53 which has a flow proportional to gas generator speed by virtue of a coupling with shaft 24 of that generator. To provide for idle speeds, a by-pass spill valve 54 is provided. A maximum speed governor valve 55 is also provided. Fuel from the pump 53 passes to the flame tube 20 by way of pipe 21.

The control system has three inputs. These are, first, a manual input from a power lever 60; and second, an air servo cylinder 61 having a piston 62 below which a reference pressure is applied by a feed from the high pressure (H.P.) outlet 16 of gas generator 10 via a reducing valve 63 and reservoir chamber 64, and above which the delivery pressure to the drive engine is fed through a connection 71. A stop 77 is provided to determine a minimum flow at design conditions. The rod 65 of the piston 62 is coupled to a damper 66 and to the arm 67 controlling the opening and closing of the rotary valve 29. The third input is a fuel servo cylinder 68 which senses fuel delivery pressure to the flame tube 20, as an indication of engine speed, by burner fuel pressure acting against a spring 69 in the cylinder 68. A connection 70 is provided for this purpose.

The servo cylinder 61 has a tapered bleed valve member 72 which is pivoted to a lever 73 which also accepts motion from the power lever 60 and from the fuel servo 69 via a connection 78. The servo 69 also has a stop 79 for setting a minimum gas generator speed at the design condition.

The lever 60, for the first part of its movement, acts via cam surfaces 74 on a lever 75 of the vent valve 32 (FIG. 10) and a fuel spill cock lever 76 for assisting start up, idling, and acceleration of the gas generator 10 to design temperature and pressure conditions. The valve 32, which can be a known form of valve, has three functions combined in a single valve: first, to provide a relief valve in case of seizure of the drive engine 11 or inability of the engine 11 to accept flow from the gas generator 10; second, to be capable of being held open as a waste gate when the gas generator is running and the drive engine is not; and third, to be capable of gradual closure to build up pressure to the drive engine in order to start it. The valve 32 relieves at just above design working pressure, and prevents excessive sudden variations in the load on the engine shaft 30 feeding back to the gas generator.

Operation will now be considered at three stages:

1. Start Up and Idling

Start-up is achieved with the power lever 60 at the appropriate position so that the vent valve in the gas generator (lever 75) is fully open and the fuel spill valve 54 (lever 76) bleeds a proportion of the fuel pump delivery back to the fuel supply.

The gas generator 10 is then driven by a starter motor to bring it up to a suitable speed and the burners in the flame tube 20 are ignited electrically. The generator 10 accelerates to a speed set by the amount of fuel delivered by the pump 53 less the bleed through valve 54. The generator 10 experiences no significant back pressure as vent valve 32 is open. The air servo and fuel servo 61, 69 have their pistons against their respective stops 77, 79 as there is insufficient pressure in the system to move them.

2. Acceleration to Minimum Power at Design Conditions

The power lever 60 is operated towards the open condition. The cams 74 associated with the lever 60 cause the vent valve in the gas generator and the fuel spill valve to close progressively. This causes an increased gas generator delivery pressure which is transmitted to the drive engine which commences to turn when the torque generated therein allows the gas generator vent valve to close completely. If torque in the drive engine is insufficient to start it then the vent valve 32 acts as a relief valve at slightly above design delivery pressure.

When design conditions of temperature and pressure are achieved the air and fuel servos 61, 69 take over control and maintain substantially constant gas generator temperature and pressure conditions at all speed and power lever positions.

FIG. 13 shows the comparative performance of the system described above with efficiency (ordinate) plotted against power (abscissae). The various curves A–D represent the following:

A—System according to the invention.
B—Diesel engine.
C—Petrol engine at full throttle.
D—Petrol engine at part throttle.

To recapitulate on the above system and to include some operational figures as an example, air is drawn into the compressor 12 and compressed to a low pressure of about 2 bars. The air thus compressed then passes to the compressor part of the gas generator 10 where it receives further compression under volume confined conditions to a high pressure of about 5 bars.

The high pressure air then has some heat added at the heat exchanger 19 whence it passes to the flame tube 20 to attain a temperature of about 1100° K. The hot high pressure gas then expands under volume confined conditions in the expander part of the generator 10 and provides enough energy to drive the auxiliaries shaft 24, and hence the oil and fuel pumps, and the compressor 12. The expanded gas, now at an intermediate pressure of about 2 bars, is exhausted from the gas generator under the combined effects of decreasing volume of the compartments it occupies and the incoming low pressure air from compressor 10.

The exhaust from the gas generator then passes through the heat exchanger 19 to give up some of its heat to the compressed air entering the flame tube 20 and from thence passes to the control valve 29 and the drive engine 11.

To increase the speed of the engine 11 and therefore to increase the power, the inlet valve to the engine 11 is opened. This lowers the back pressure at the generator 10 and the generator 10 increases in speed to increase the mass flow through the system until the back pressure regains its designed level.

To decrease speed the opposite sequence of events takes place.

For idling conditions vent valve 32 is opened so that there is venting to atmosphere. To start up the vent valve is gradually closed.

In one application of the invention, the compressor 12, gas generator 10, flame tube 20 and heat exchanger 19 are situated under the bonnet of a vehicle and two engines 11 are provided, each driving a rear wheel of the vehicle but not moving with the suspension of the vehicle. The gas generator has a speed range of 600 to 3,000 R.P.M.

Air mass flow is at the rate of 1 Kg/Sec at full load with a maximum temperature of 1100° K., and an inlet temperature of 560° K. and pressure of 2 bars to the engine and an exhaust temperature of 450° K.

A fixed speed change gear may be provided between drive engine and the vehicle wheels depending upon the nature of the vehicle.

A reverse gear and dog clutch is also required for reversing the vehicle.

Because the compressor 12 and part of the generator 10 are in essence positive displacement compressors, their compression ratio is independent of their speed and can be kept substantially constant over their full speed range.

Fuel supply to the flame tube 20 is controlled to match air flow requirements and thus the flame temperature in the flame tube is also substantially constant.

At any given stable power level the expander part of the gas generator 10 expands to a substantially constant pressure and hence the drive engine 11 experiences a substantially constant pressure.

The drive engine 11 has a substantially constant pressure drop between inlet and outlet at all useful speeds.

Power variation is achieved by varying the air mass flow through the system by varying the gas generator speed.

Whilst the pressure of 5 bars at the compressor part outlet of generator 10 has been conveniently referred to as "high pressure" it is not a high pressure when compared with that existing in many other power systems. With the maximum pressure in the system being relatively low, then the pressure difference between compartments of the units 12, 10 and 11 is also low (typically a maximum of about ½ bar which occurs in the compressor part of generator 10) and leakage across vane tips becomes acceptable with a reasonable design clearance between vane tips and casing of those units. The pressure differences being substantially constant, as also are the corresponding temperatures, the designing of the clearances is greatly facilitated and no major accommodation is required for temperature changes once the system is running.

As the gas generator is not mechanically coupled with the drive engine, the gas generator can be run at a speed to give maximum power when the drive engine speed is zero. In this way a high starting torque can be generated and the need for a conventional gear box and clutch is avoided. A gear and clutch system for engine reversal will normally be required. This could be a 4:1 reduction gear with dog clutches fitted between drive motor and vehicle wheels.

For a drive engine of 120 b.h.p. with a maximum speed of 3,000 R.P.M. (or four 30 b.h.p. motors each driving a wheel of a vehicle) it is estimated that a gas generator of overall size of 450 mm × 450 mm × 600 mm would be required. The drive motors of 30 b.h.p. each would occupy a cylindrical volume of 450 mm diameter and 225 mm long.

Lubrication can be divorced from combustion. A cooling system, other than that provided by a circulating oil system to bearings and seals, is not required.

Exhaust pollution is low and the exhaust temperature may be about 180° Celcius (450° K.).

We claim:

1. A power system comprising a rotary device (10) (conveniently called a "gas generator") of the kind having a rotor eccentrically disposed in a casing to establish an eccentric annulus divided into separate compartments each of which defines a confined void whose volume changes cyclically as the rotor rotates relative to the casing, means (12) for feeding compressed ambient cold air to said device (10) to compress the air further over a part of the eccentric annulus of the device, means (20) including a flame combustor for adding heat to said further compressed air, means allowing the heated further compressed air to expand partially in another part of the eccentric annulus of the rotary device (10) to generate power, means (24) auxiliary to the system utilizing said power, at least one further rotary device (11) (conveniently called a "drive engine") of the kind having a rotor eccentrically disposed in a casing to establish an eccentric annulus divided into separate compartments each of which defines a confined void whose volume changes cyclically as the rotor rotates relative to the casing, means (27) for conducting the partially expanded heated further compressed air to said further rotary device (11) to allow further expansion and generation of further power, valve means (29) for controlling the mass flow through the conducting means (27) and thereby change the back pressure at the rotary device (10) to change the speed of the rotary device (10), in which the rotary device (10) and said further rotary device (11) are devoid of mechanical drive coupling to each other; and control means (61, 69) to maintain the flame temperature of said combustor substantially constant at all loaded speeds of said further rotary device (11).

2. A system as claimed in claim 1 in which said valve means (29) regulates the cut-off position of the mass flow fed to said similar rotary device (11).

3. A system as claimed in claim 1 in which said further compressed air is exhausted from said rotary device (10) to said means (20) for adding heat via a heat exchanger (19) to preheat that air before it enters the heat adding means (20), the pre-heat being derived from the expanded heated further compressed air.

4. A power system as claimed in claim 1 coupled to power a motor vehicle.

* * * * *